(12) United States Patent
Fujimoto et al.

(10) Patent No.: US 12,128,817 B2
(45) Date of Patent: Oct. 29, 2024

(54) WORKING VEHICLE

(71) Applicant: KUBOTA CORPORATION, Osaka (JP)

(72) Inventors: Shinji Fujimoto, Sakai (JP); Norita Tottori, Sakai (JP); Ryosuke Tanaka, Sakai (JP); Maho Yamanaka, Sakai (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/544,534

(22) Filed: Dec. 19, 2023

(65) Prior Publication Data

US 2024/0116435 A1   Apr. 11, 2024

Related U.S. Application Data

(63) Continuation of application No. PCT/JP2022/015128, filed on Mar. 28, 2022.

(30) Foreign Application Priority Data

Jun. 28, 2021 (JP) ................. 2021-107069

(51) Int. Cl.
   *B60Q 1/32* (2006.01)
   *B60Q 1/26* (2006.01)

(52) U.S. Cl.
   CPC ............. *B60Q 1/32* (2013.01); *B60Q 1/2692* (2013.01); *B60Q 1/2661* (2013.01)

(58) Field of Classification Search
   CPC ....... B60Q 1/32; B60Q 1/2692; B60Q 1/2661
   See application file for complete search history.

(56) References Cited

U.S. PATENT DOCUMENTS

| | | | | |
|---|---|---|---|---|
| 6,009,650 A | * | 1/2000 | Lamparter | G09F 9/33 362/478 |
| 6,337,623 B1 | * | 1/2002 | Krugh, IV | B60Q 1/2611 340/487 |
| 9,764,680 B2 | * | 9/2017 | Tamay | B60Q 1/46 |
| 10,829,035 B2 | * | 11/2020 | Robertson | F21V 21/26 |
| 11,135,966 B1 | * | 10/2021 | Regenauer | B60Q 1/2657 |
| 2007/0252538 A1 | * | 11/2007 | Swanger | B60Q 1/2692 340/433 |
| 2019/0039537 A1 | | 2/2019 | Tsuji et al. | |
| 2021/0053484 A1 | * | 2/2021 | Paton | B60Q 1/52 |

FOREIGN PATENT DOCUMENTS

| | | |
|---|---|---|
| JP | 61-50845 A | 3/1986 |
| JP | 62-26746 U | 2/1987 |
| JP | 3-25038 A | 2/1991 |
| JP | H11310159 A | 11/1999 |
| JP | 2017-19454 A | 1/2017 |
| JP | 2019-26169 A | 2/2019 |

OTHER PUBLICATIONS

Official Communication issued in International Patent Application No. PCT/JP2022/015128, mailed on May 31, 2022.

* cited by examiner

*Primary Examiner* — Arman B Fallahkhair
(74) *Attorney, Agent, or Firm* — Keating & Bennett, LLP

(57) ABSTRACT

A utility vehicle includes a fixing portion to which a lamp is fixed, and a support portion that supports the fixing portion and is capable of switching a position of the fixing portion between a use position where at least a portion of the lamp is located outside a vehicle body with respect to a fender and a storage position where the lamp is located inside the vehicle body with respect to the fender.

17 Claims, 11 Drawing Sheets

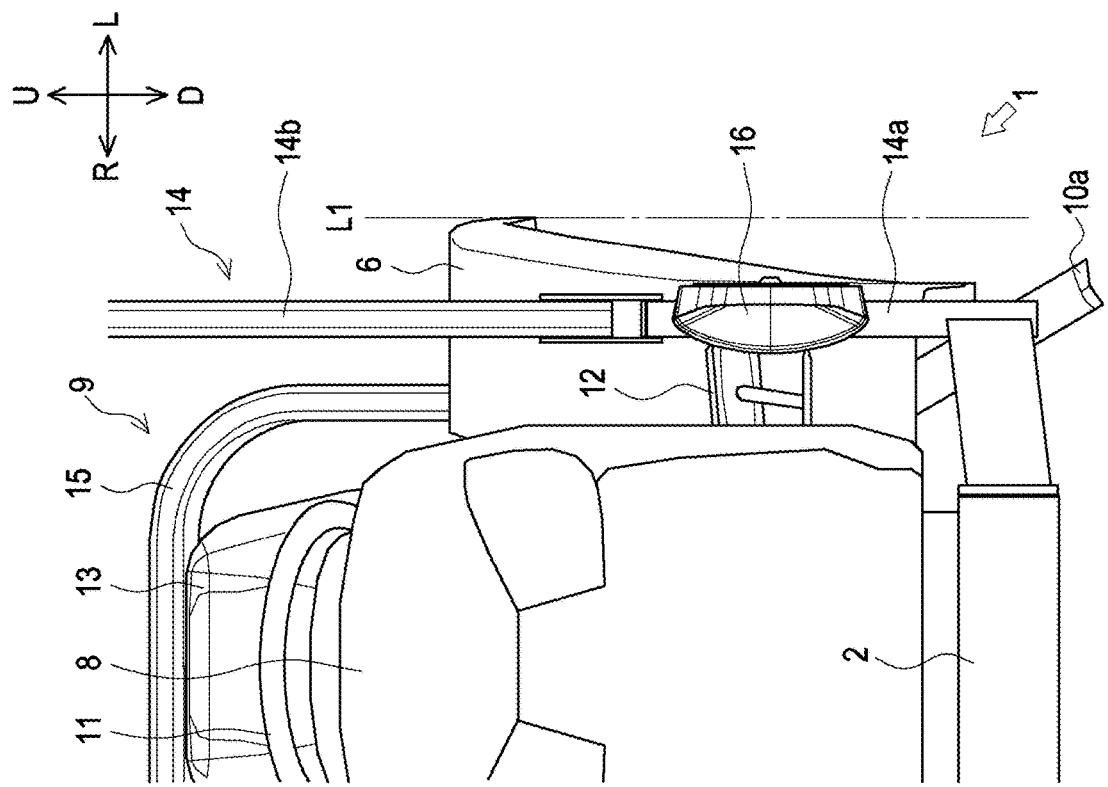
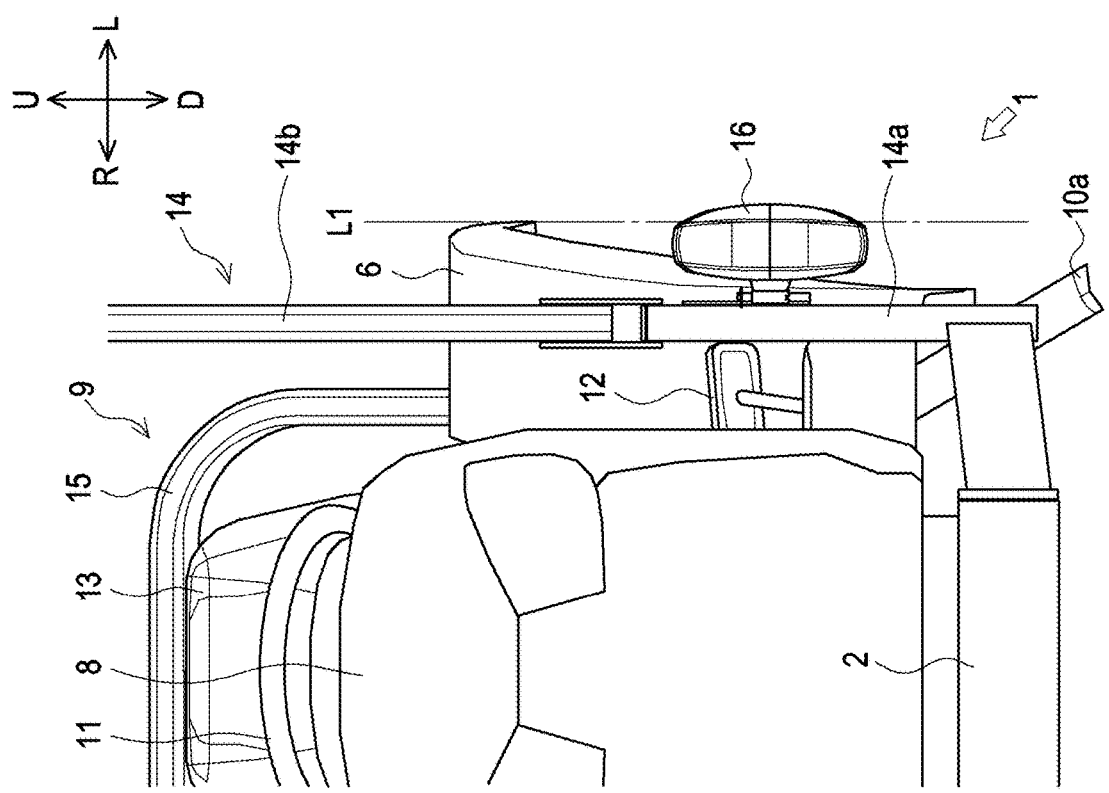

WORKING VEHICLE

CROSS REFERENCE TO RELATED APPLICATIONS

This application claims the benefit of priority to Japanese Patent Application No. 2021-107069 filed on Jun. 28, 2021 and is a Continuation Application of PCT Application No. PCT/JP2022/015128 filed on Mar. 28, 2022. The entire contents of each application are hereby incorporated herein by reference.

BACKGROUND OF THE INVENTION

1. Field of the Invention

The present invention relates to techniques of working vehicles each including a lamp.

2. Description of the Related Art

Conventionally, a technique of a working vehicle including a lamp is known. For example, JP 2017-19454 A discloses such a technique.

JP 2017-19454 A discloses a working vehicle in which a combination lamp arm is provided so as to protrude laterally from left and right front pillars of a cabin, and a lamp (blinker and work lamp) is attached to a distal end of the combination lamp arm. In the technique described in JP 2017-19454 A, it is possible to reduce the manufacturing cost by attaching a plurality of types of lamps (blinkers and work lamps) to a common member (combination lamp arm).

However, in the technique described in JP 2017-19454 A, since the lamp is provided so as to protrude to the left and right, there is a possibility that the lamp interferes with surrounding crops, obstacles (trees and the like), and the like during work in a narrow place (for example, management work between trees), and there is a possibility that the crops and the lamp are damaged, and thus there is room for improvement.

SUMMARY OF THE INVENTION

Example embodiments of the present invention provide working vehicles each capable of preventing a lamp from interfering with surrounding crops, obstacles, and the like.

The problem to be solved by example embodiments of the present disclosure is as described above, and example embodiments to solve the problem will be described below.

A working vehicle according to an example embodiment of the present disclosure includes a fixing portion to which a lamp is fixed, and a support portion that supports the fixing portion and is capable of switching a position of the fixing portion between a use position where at least a portion of the lamp is located on an outer side of a vehicle body with respect to a fender and a storage position where the lamp is located on an inner side of the vehicle body with respect to the fender.

Furthermore, the support portion supports the fixing portion such that an irradiation surface of the lamp faces an inside of the vehicle body in a state in which the fixing portion is in the storage position.

Furthermore, the fixing portion includes a flat plate portion with a flat plate shape and fixed to a surface of the lamp on a side opposite to the irradiation surface.

Furthermore, the lamp is on a front side of the vehicle body with respect to a step for an operator to board, and the supporting portion is capable of switching to the storage position by rotating forward the fixing portion from the use position.

Furthermore, the support portion is in a safety frame on a front side of the vehicle body with respect to the step.

Furthermore, the support portion supports the fixing portion such that at least a portion of the lamp is located on an inner side of the vehicle body with respect to the safety frame in a state in which the fixing portion is in the storage position.

Furthermore, a working vehicle according to an example embodiment of the present disclosure further includes a wiring connected to the lamp and extending through an inside of the vehicle body of the safety frame.

Furthermore, the support portion supports the fixing portion such that an irradiation surface of the lamp faces an outside of the vehicle body in a state in which the fixing portion is in the storage position.

Furthermore, the support portion is capable of switching to the storage position by rotating rearward the fixing portion from the use position.

Furthermore, a working vehicle according to an example embodiment of the present disclosure further includes a holder capable of holding the fixing portion at the use position or the storage position.

The following advantageous effects of example embodiments of the present disclosure may be obtained.

According to one example embodiment of the present disclosure, by switching the position of the lamp (fixing portion) to the storage position, it is possible to prevent the lamp from interfering with surrounding crops, obstacles, and the like. As a result, it is possible to work in a narrow place. Furthermore, it is possible to reduce or prevent damage to the crop and damage to the lamp.

Furthermore, according to one example embodiment of the present disclosure, since the irradiation surface of the lamp faces the inside of the vehicle body at the storage position, it is possible to effectively reduce or prevent damage to the lamp (in particular, the irradiation surface).

Furthermore, according to one example embodiment of the present disclosure, the lamp can be protected from the outside by the flat plate portion (fixing portion) at the storage position, and damage to the lamp can be effectively reduced or prevented.

Furthermore, according to one example embodiment of the present disclosure, in a case where the lamp is switched to the storage position, the lamp can be prevented from hindering the operator by being rotated in a direction away from the step (forward).

Furthermore, according to one example embodiment of the present disclosure, the lamp can be firmly supported.

Furthermore, according to one example embodiment of the present disclosure, at least a portion of the lamp is located inside the vehicle body with respect to the safety frame at the storage position, so that it is possible to effectively reduce or prevent damage to the lamp.

Furthermore, according to one example embodiment of the present disclosure, it is possible to prevent the wiring from interfering with surrounding crops, obstacles, and the like.

Furthermore, according to one example embodiment of the present disclosure, since the irradiation surface of the lamp faces the outside of the vehicle body at the storage position, it is possible to effectively reduce or prevent damage to a back surface of the lamp.

Furthermore, according to one example embodiment of the present disclosure, interference with surrounding crops, obstacles, and the like can be effectively reduced or prevented by housing the fixing portion (lamp) at a rearward position.

Furthermore, according to one example embodiment of the present disclosure, the lamp (fixing portion) can be stably held at a predetermined position (the use position and the storage position).

The above and other elements, features, steps, characteristics and advantages of the present invention will become more apparent from the following detailed description of the example embodiments with reference to the attached drawings.

BRIEF DESCRIPTION OF THE DRAWINGS

FIG. 9A is a front view illustrating the lamp at a use position. FIG. 9B is a front view illustrating the lamp at the storage position.

DETAILED DESCRIPTION OF THE EXAMPLE EMBODIMENTS

Figure 1:
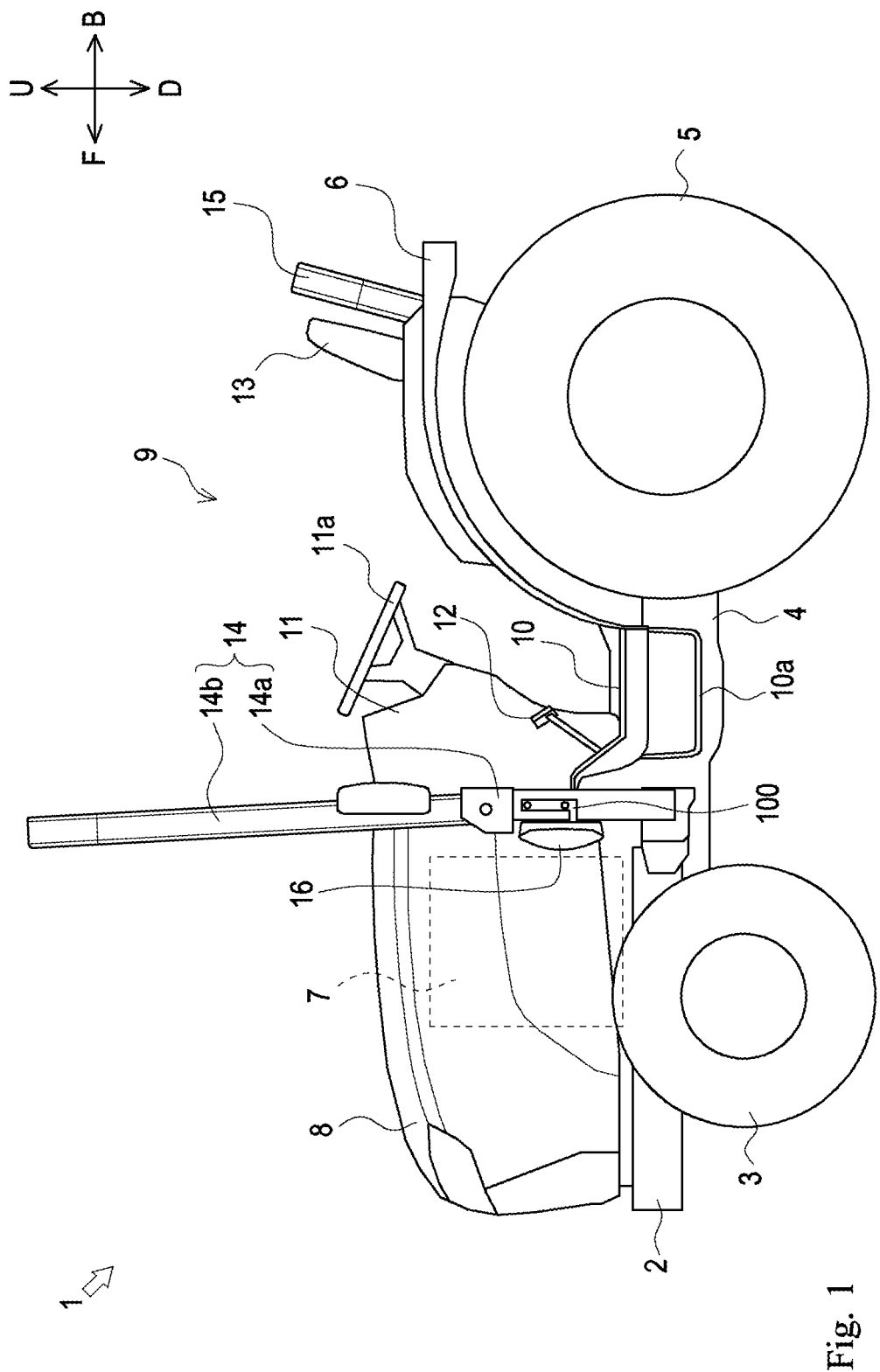
FIG. 1 is a side view illustrating an overall configuration of a tractor according to a first example embodiment of the present invention.
Figure 2:
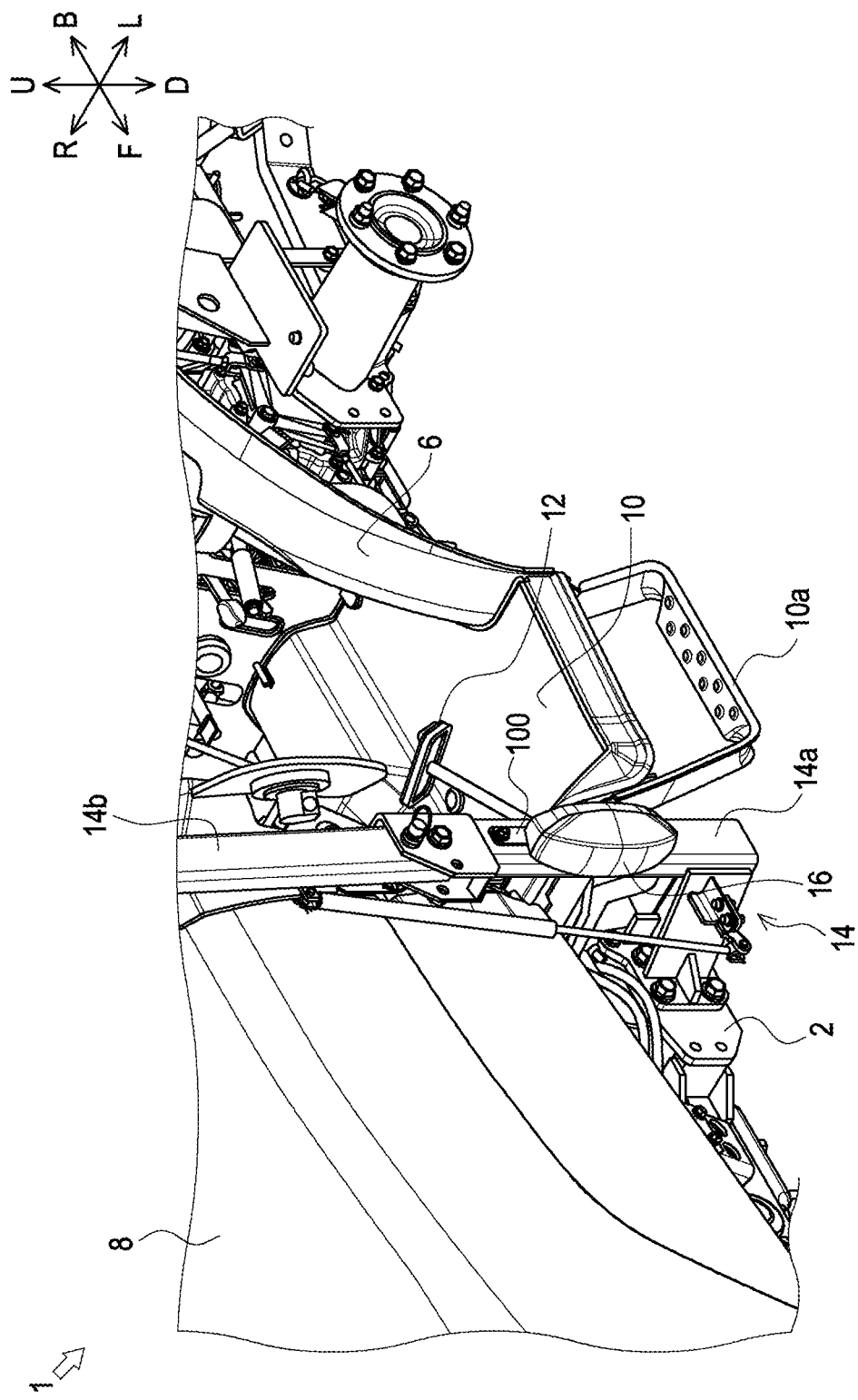
FIG. 2 is a front perspective view illustrating a lamp and a support mechanism.
Figure 3:
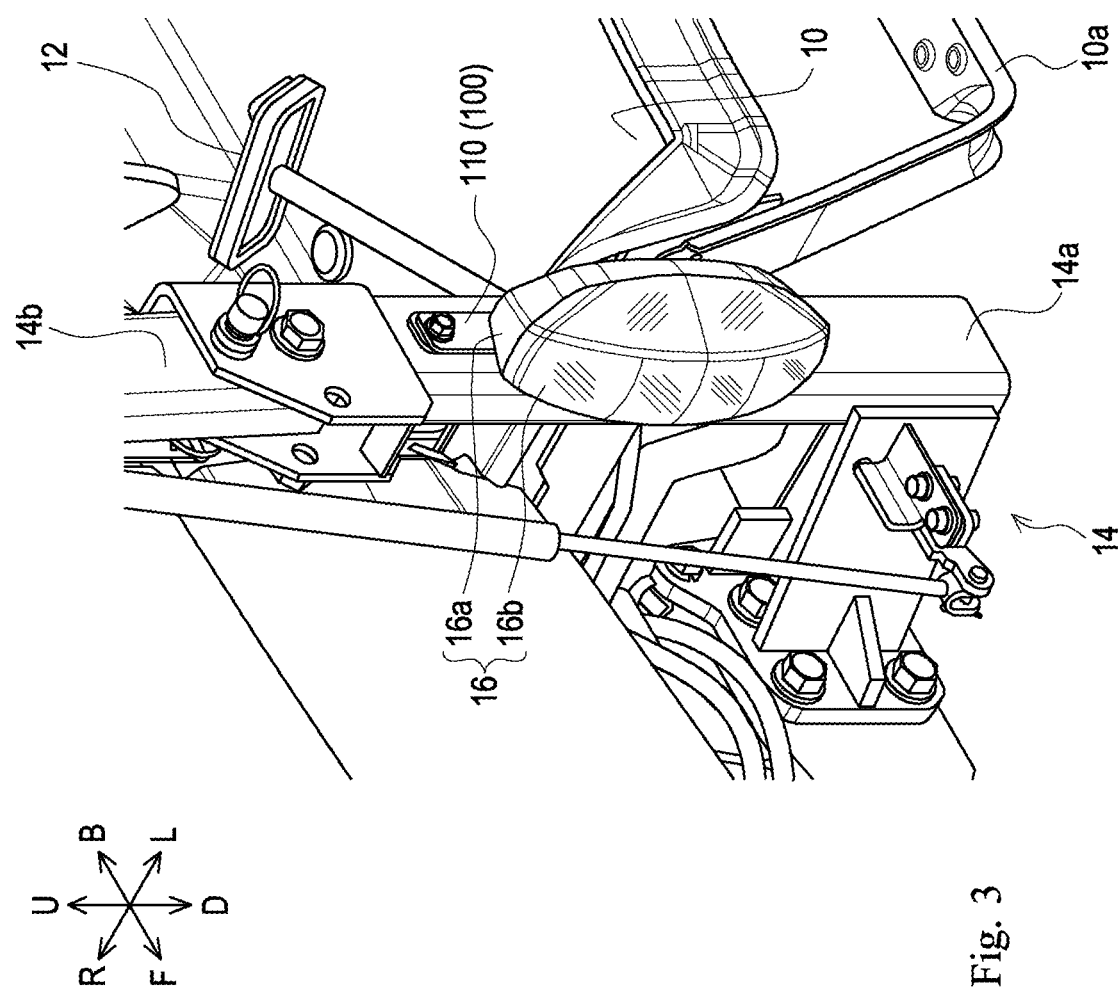
FIG. 3 is an enlarged front perspective view illustrating the lamp and the support mechanism.

In the following description, directions indicated by arrows U, D, F, B, L, and R in the drawings are defined as an upward direction, a downward direction, a forward direction, a backward direction, a left direction, and a right direction, respectively.

First, an overall configuration of a tractor 1 according to a first example embodiment of the present invention will be described mainly with reference to FIGS. 1 to 4.

The tractor 1 mainly includes a body frame 2, front wheels 3, a transmission device 4, rear wheels 5, a fender 6, an engine 7, a bonnet 8, a driving operation unit 9, a front safety frame 14, a rear safety frame 15, lamps 16, wiring 17, and a support mechanism 100.

The body frame 2 is disposed with its longitudinal direction oriented in a front-rear direction. A front portion of the body frame 2 is supported by the pair of left and right front wheels 3. The transmission device 4 is provided at a rear portion of the body frame 2. A rear portion of the transmission device 4 is supported by the pair of left and right rear wheels 5. The rear wheel 5 is covered upward and forward by a pair of the left and right fenders 6. The engine 7 is provided in a front-rear middle portion of the body frame 2. The engine 7 is covered with the bonnet 8. The driving operation unit 9 for an operator to drive the tractor 1 is provided behind the engine 7.

The driving operation unit 9 is provided with a step 10, a steering post 11, a clutch pedal 12, a seat 13, and the like.

The step 10 defines a floor surface for an operator to board. An auxiliary step 10a to assist the operator to board the step 10 is provided on a side of the step 10. The steering post 11 is provided at a front portion of the driving operation unit 9. A steering wheel 11a to steer the tractor 1 is provided above the steering post 11.

The clutch pedal 12 to operate a clutch mechanism (not illustrated) of the tractor 1 is provided in front of the step 10 (on the left side of the steering post 11). Furthermore, although not illustrated, various other operation pedals (accelerator pedal, brake pedal, etc.) are provided in the step 10. The seat 13 on which an operator sits is provided at a rear portion of the driving operation unit 9.

The front safety frame 14 and the rear safety frame 15 to protect an operator on board the driving operation unit 9 are provided in front of and behind the driving operation unit 9. The front safety frame 14 is provided in front of the driving operation unit 9. The front safety frame 14 includes a lower frame 14a fixed to a rear portion of the body frame 2, and an upper frame 14b provided so as to be able to rock forward and backward with respect to the lower frame 14a. The rear safety frame 15 is provided behind the driving operation unit 9.

Each of the lamps 16 is a lighting fixture capable of emitting light as necessary. The lamp 16 according to the present example embodiment is a lighting fixture (so-called combination lamp) that can be used for a plurality of applications (direction indicators and vehicle width lights). The lamp 16 mainly includes a lamp housing 16a and a translucent cover 16b (see FIGS. 3 and 4).

The lamp housing 16a is provided with a light emitter (such as a light bulb) that emits light. The translucent cover 16b covers the light emitter provided in the lamp housing 16a. Light from the light emitter passes through the translucent cover 16b and is emitted to the outside. That is, a surface of the lamp 16 on the side where the translucent cover 16b is provided (for example, in FIG. 3, a front side surface of the lamp 16) serves as an irradiation surface that irradiates the outside with light. The wiring 17 to supply power and transmit a control signal is connected to a back surface (surface opposite to the irradiation surface) of the lamp 16 (lamp housing 16a) (see FIG. 4).

The lamps 16 are disposed on the left and right sides of the bonnet 8 in front of the driving operation unit 9. Each of the lamps 16 is provided on the front safety frame 14 (more specifically, the lower frame 14a) through the support mechanism 100.

In such a tractor 1, the power of the engine 7 is shifted in speed by the transmission device 4 and then transmitted to the front wheels 3 and the rear wheels 5 through an appropriate power transmission mechanism. The front wheels 3 and the rear wheels 5 are rotationally driven by the power of the engine 7, and the tractor 1 travels. The steering wheel 11a can adjust (change) a turning angle of the pair of right and left front wheels 3 and 3 according to a turning operation amount to steer the tractor 1.

Figure 4:
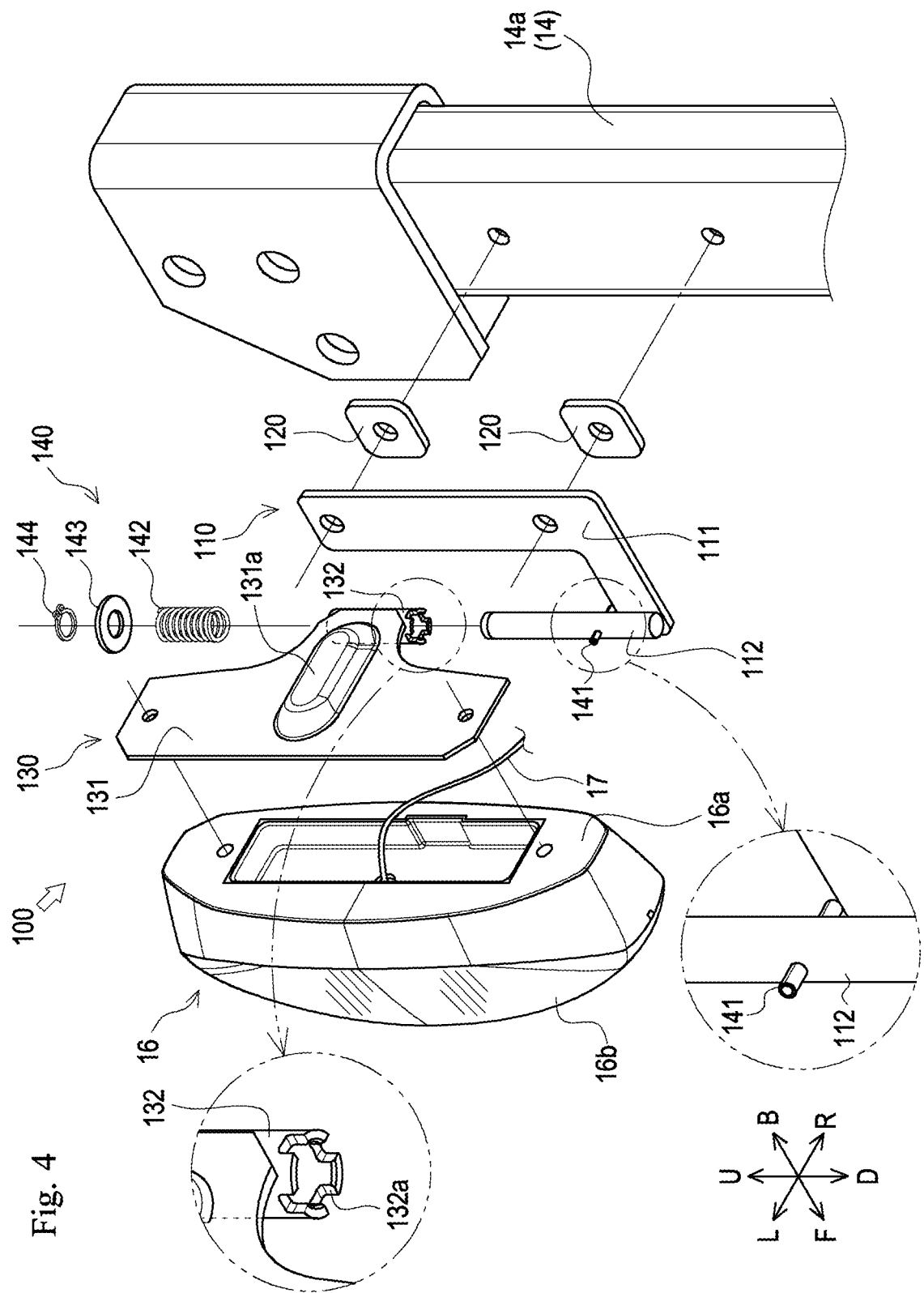
FIG. 4 is a rear exploded perspective view illustrating the lamp and the support mechanism.

Next, the configuration of the support mechanism 100 will be described mainly with reference to FIGS. 4 and 5. Note that, although the support mechanisms 100 are provided on the left and right sides of a vehicle body of the tractor 1, the left and right support mechanisms 100 are bilaterally symmetric. Therefore, the description below focuses on the left support mechanism 100.

Figure 8:
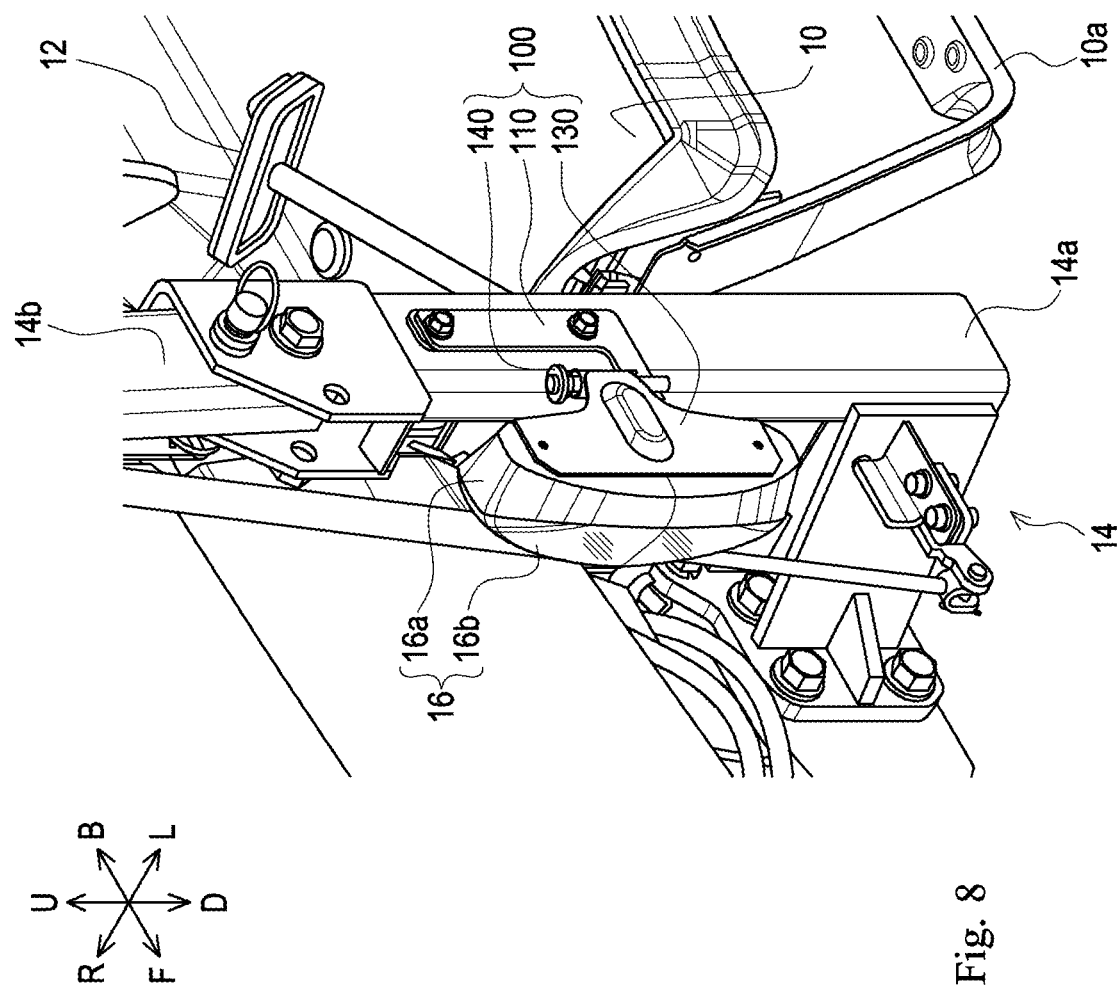
FIG. 8 is an enlarged front perspective view illustrating the lamp and the support mechanism switched to the storage position.

The support mechanism 100 supports the lamp 16. The support mechanism 100 can switch a position of a fixing portion 130 (in turn, the lamp 16) to be described later between a use position (See FIGS. 3 and 9A) where at least a portion of the lamp 16 is located on an outer side of the vehicle body than the fender 6 in the left-right direction and a storage position (See FIGS. 8 and 9B) where the lamp 16 is located on an inner side of the vehicle body than the fender 6. Note that FIGS. 1 to 5 illustrate a state in which the fixing portion 130 is switched to the use position. Hereinafter, the configuration of the support mechanism 100 will be described based on the state. The support mechanism 100 mainly includes a support portion 110, a vibration proofing member 120, the fixing portion 130, and a holding mechanism 140.

The support portion 110 illustrated in FIGS. 4 and 5 supports the lamp 16 through the fixing portion 130 to be described later. The support portion 110 mainly includes a first flat plate portion 111 and an insertion portion 112.

The first flat plate portion 111 is a portion with a flat plate shape with a plate surface facing left and right. The first flat plate portion 111 is preferably L-shaped or substantially L-shaped in a side view including a portion extending upward and downward and a portion protruding forward from a lower portion thereof.

The insertion portion 112 preferably has a columnar shape with an axial direction facing up and down. A lower end portion of the insertion portion 112 is fixed to a front lower portion of the first flat plate portion 111. Thus, the insertion portion 112 protrudes upward from the front lower portion of the first flat plate portion 111.

The vibration proofing member 120 reduces or prevents transmission of vibration from the vehicle body of the tractor 1 to the lamp 16. The vibration proofing member 120 preferably has a rectangular or substantially rectangular plate shape. The vibration proofing member 120 is made of a material having vibration-proof properties, such as rubber.

The fixing portion 130 is a portion to which the lamp 16 is fixed. The fixing portion 130 mainly includes a second flat plate portion 131 and a cylindrical portion 132.

The second flat plate portion 131 preferably has a flat plate shape with a plate surface facing forward and backward. The second flat plate portion 131 preferably has a T-shape in a rear view including a portion extending upward and downward and a portion protruding laterally (rightward) from an up-down middle portion. A recess 131a is provided in the second flat plate portion 131.

The recess 131a is a portion formed by recessing an up-down central portion of the second flat plate portion 131 rearward. The recess 131a preferably has an elliptical or substantially elliptical shape that is long in the left-right direction.

The cylindrical portion 132 preferably has a cylindrical shape with an axial direction facing up and down. The cylindrical portion 132 is fixed to a right end portion of the second flat plate portion 131. Notches 132a are located in the cylindrical portion 132.

The notches 132a are formed so as to cut out a lower end portion of the cylindrical portion 132 upward. The notches 132a are located at four positions on the front, rear, left, and right of the lower end portion of the cylindrical portion 132. As a result, the notches 132a are located at equal or substantially equal intervals (every 90 or approximately 90 degrees about an axis of the cylindrical portion 132).

The holding mechanism 140 holds the fixing portion 130 at the use position or the storage position. The holding mechanism 140 mainly includes a pin 141, a spring 142, a plain washer 143, and a retaining ring 144.

The pin 141 preferably has a cylindrical or substantially cylindrical shape. The pin 141 is capable of being laterally inserted through a lower portion of the insertion portion 112. The pin 141 is disposed such that left and right end portions respectively protrude to the left and right from the insertion portion 112.

The spring 142 biases the fixing portion 130 downward. The spring 142 may be a compression coil spring, for example.

The plain washer 143 preferably has an annular flat plate shape. The retaining ring 144 is engageable with the insertion portion 112.

In the support mechanism 100 configured as described above, the first flat plate portion 111 is fixed to an outer surface (left side surface) of the lower frame 14a of the front safety frame 14 with a fixing tool such as a bolt. Accordingly, the support portion 110 is fixed to the front safety frame 14. At this time, the vibration proofing member 120 is disposed between the lower frame 14a and the first flat plate portion 111. As a result, transmission of vibration from the vehicle body of the tractor 1 to the support portion 110 (in turn, the lamp 16) can be reduced or prevented. In a state where the support portion 110 is fixed to the front safety frame 14, the insertion portion 112 is located on the front side of the front safety frame 14 (lower frame 14a).

Furthermore, the second flat plate portion 131 is fixed to the back surface of the lamp 16 (lamp housing 16a) with a fixing tool such as a bolt. At this time, the wiring 17 connected to the lamp 16 is led out toward an inner side (right side) of the vehicle body through a space (more specifically, the recess 131a of the second flat plate portion 131) between the lamp 16 and the second flat plate portion 131 (see FIG. 10).

Furthermore, the cylindrical portion 132, the spring 142, and the plain washer 143 are sequentially inserted into the insertion portion 112. Moreover, the retaining ring 144 is locked to an upper end portion of the insertion portion 112 above the plain washer 143. The retaining ring 144 can prevent the cylindrical portion 132, the spring 142, and the plain washer 143 from falling off the insertion portion 112.

Figure 5:
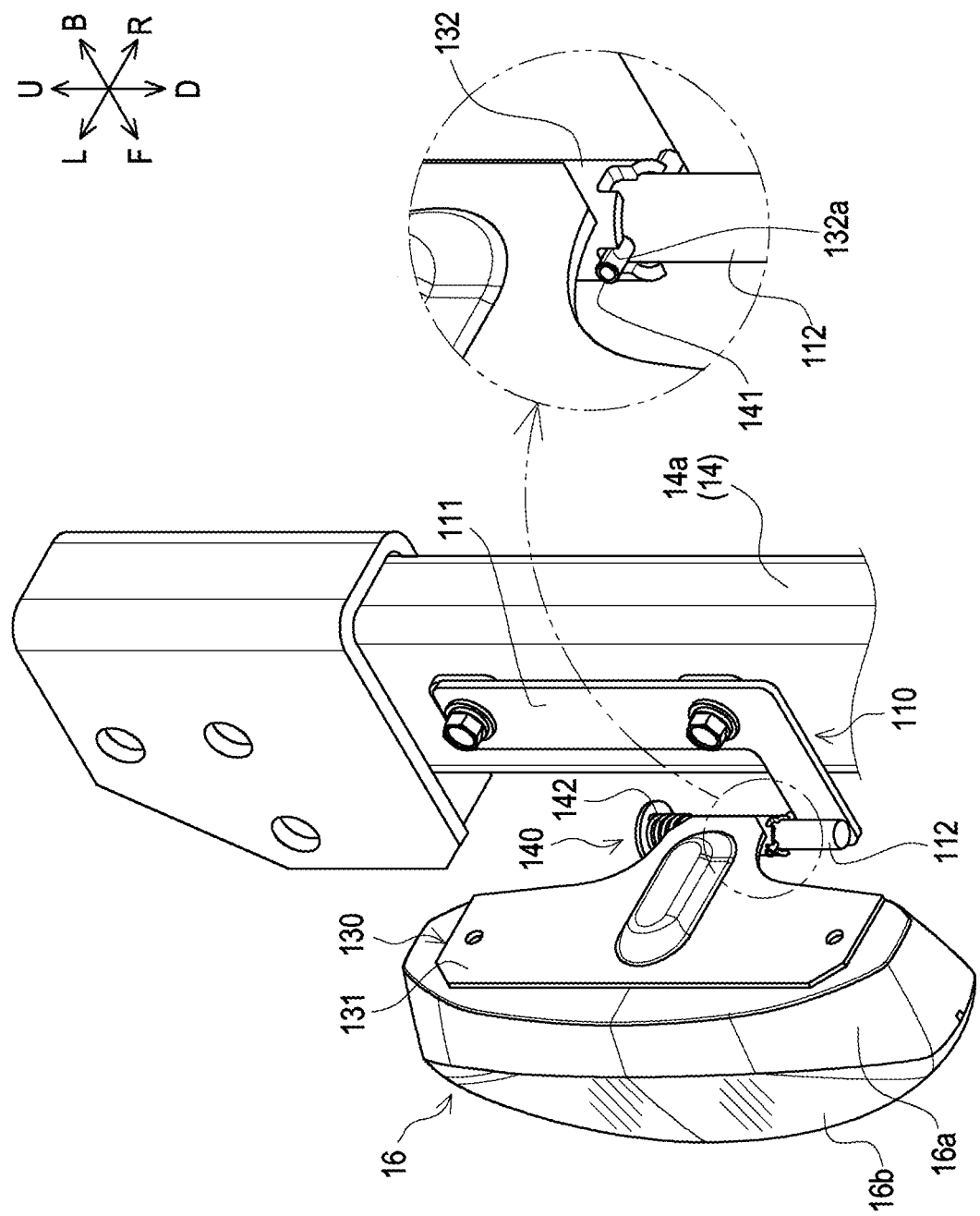
FIG. 5 is a rear perspective view illustrating the lamp and the support mechanism.

In this state, the cylindrical portion 132 is biased downward by the spring 142, and the notches 132a at the lower end portion of the cylindrical portion 132 are engaged with the pin 141 as illustrated in FIG. 5. Therefore, the rotation of the cylindrical portion 132 with respect to the insertion portion 112 is restricted, and the fixing portion 130 (lamp 16) is held at the use position. At the use position, the fixing portion 130 is disposed such that the second flat plate portion 131 protrudes from the cylindrical portion 132 toward an outer side (left side) of the vehicle body. Furthermore, the lamp 16 fixed to the fixing portion 130 is disposed with the irradiation surface (translucent cover 16b) facing forward.

In this way, the lamp 16 is attached to the front safety frame 14 through the support mechanism 100. In this manner, the lamp 16 can be firmly supported by attaching the lamp 16 to the front safety frame 14 having relatively high rigidity of the tractor 1.

Figure 10:
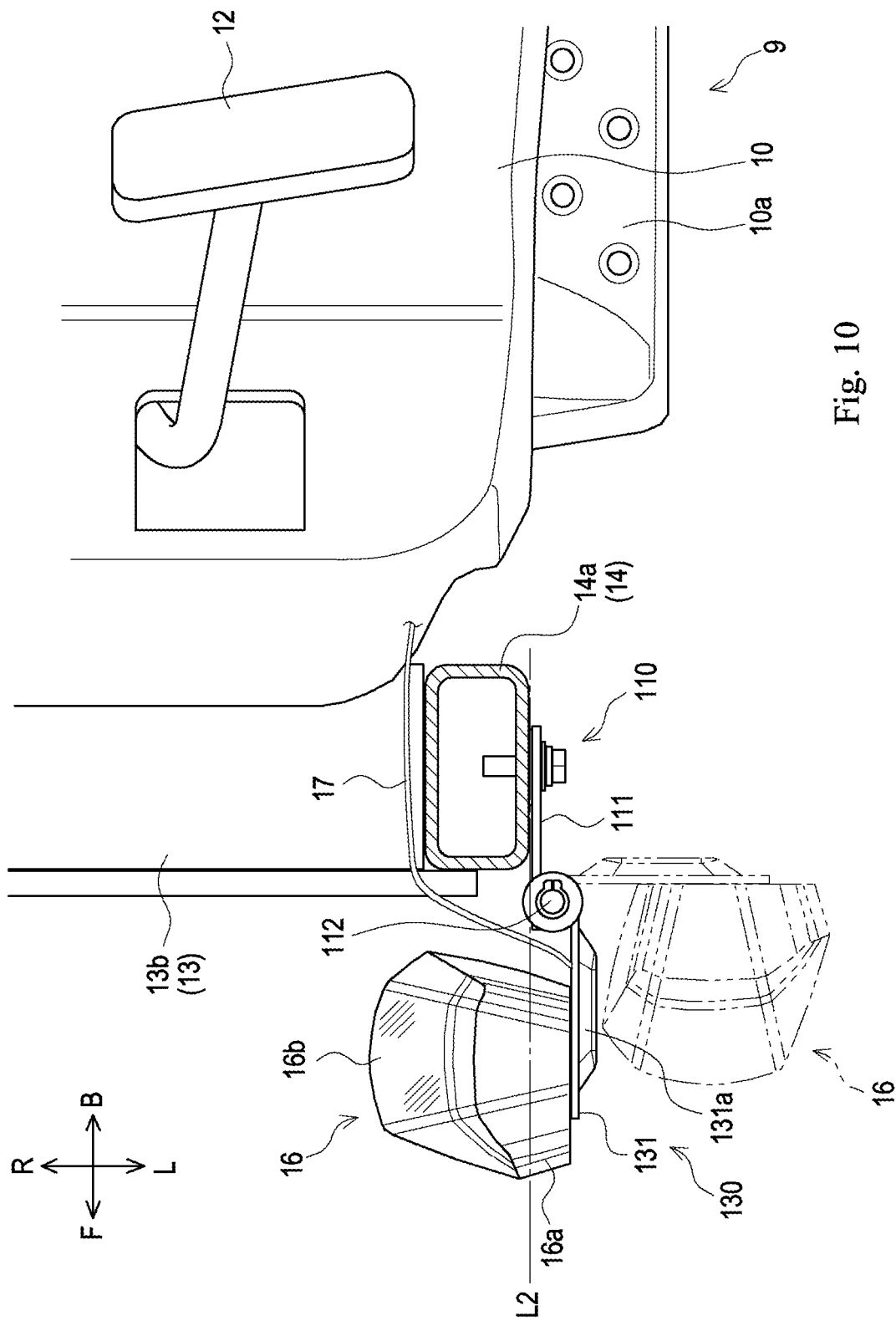
FIG. 10 is a partial cross-sectional plan view illustrating the lamp and the support mechanism.

Furthermore, as illustrated in FIG. 10, the lamp 16 is disposed on the front side of the front safety frame 14. That is, the lamp 16 is disposed on the front side of the step 10 on which the operator boards. The wiring 17 connected to the lamp 16 is disposed to pass through the inside (right side) of the front safety frame 14 (lower frame 14a). The wiring 17 is appropriately connected to a battery serving as a power supply, a control board (not illustrated) disposed in the steering post 11, and the like.

Figure 6:
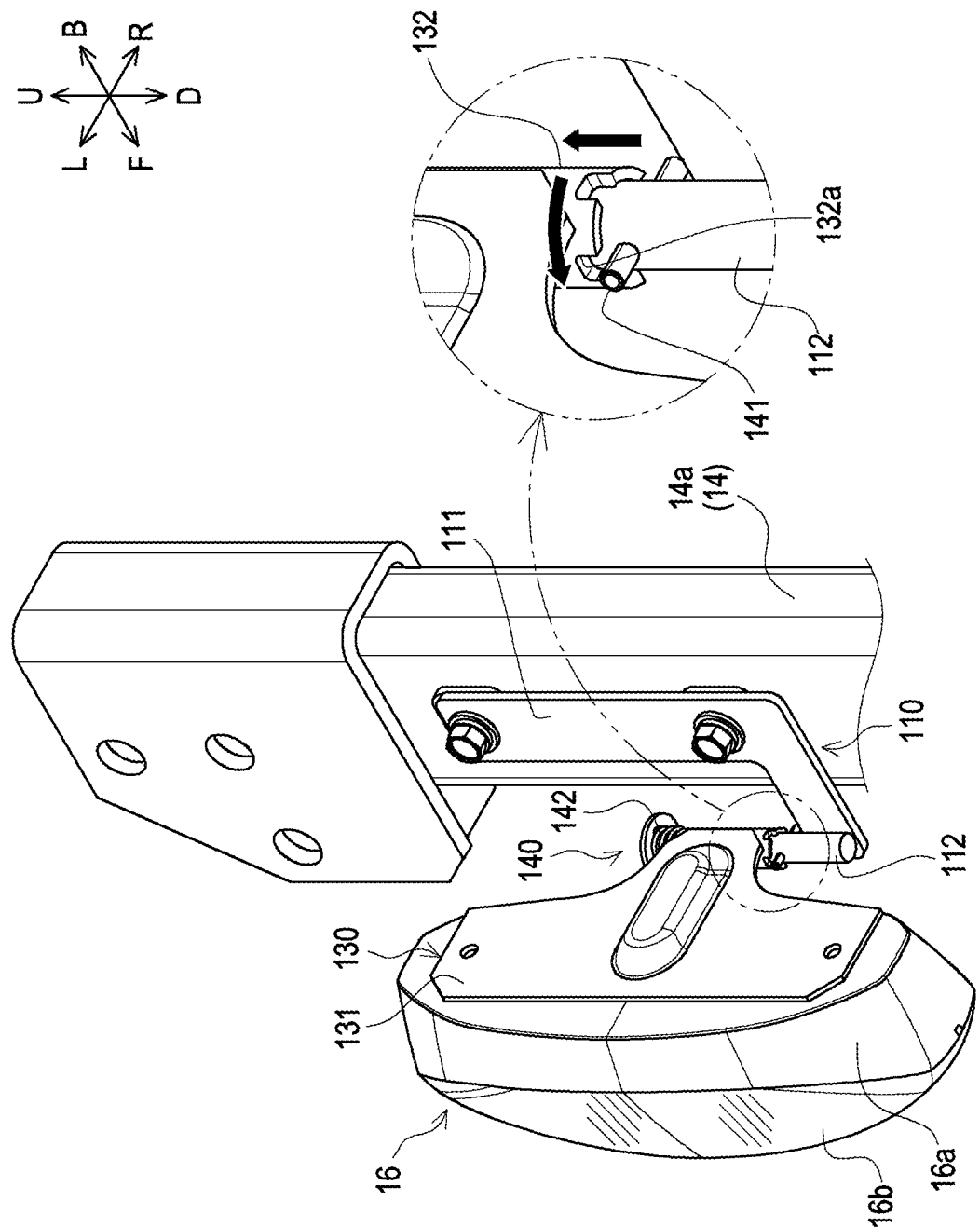
FIG. 6 is a rear perspective view illustrating a state in which a fixing portion (lamp) is lifted from a use position.

In a case where the fixing portion 130 (lamp 16) is switched from the use position to the storage position, as illustrated in FIG. 6, the fixing portion 130 is lifted up against the biasing force of the spring 142. As a result, the engagement between the notches 132a and the pin 141 is released, and the cylindrical portion 132 can rotate with respect to the insertion portion 112.

Figure 7:
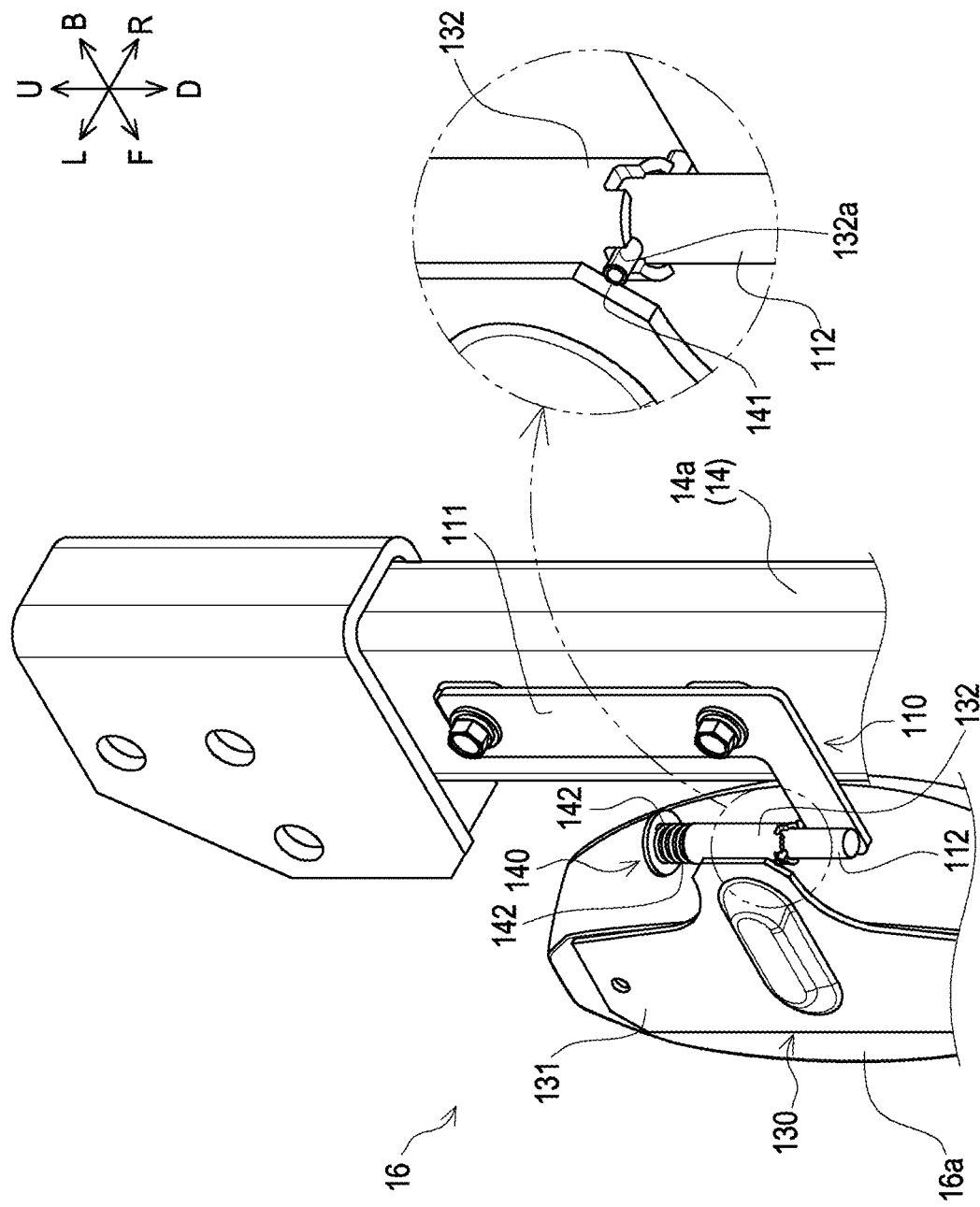
FIG. 7 is a rear perspective view illustrating a state in which a fixing portion (lamp) is switched to a storage position.

In this state, the fixing portion 130 (lamp 16) is rotated forward. When the fixing portion 130 is rotated by 90 degrees from the use position, a position of the notches 132a different from the notches 132a with which the pin 141 is engaged at the use position coincides with a position of the pin 141. In this state, as illustrated in FIG. 7, the fixing portion 130 is lowered to engage the notches 132a with the pin 141. Consequently, the fixing portion 130 (lamp 16) can be held at the storage position.

Note that by performing an operation opposite to the above-described operation, the fixing portion 130 (lamp 16) can be switched from the storage position to the use position.

Hereinafter, an arrangement of the lamp 16 configured as described above at the use position and the storage position will be described.

In a case where the lamp 16 is used, such as a case where the tractor 1 travels on a road, the lamp 16 is switched to the use position. As illustrated in FIG. 9A, in a state where the lamp 16 is switched to the use position from the viewpoint of viewing the tractor 1 from the front direction (front view), a left end of the lamp 16 is located on an outer side (left side) of an outer end of the fender 6 (see an auxiliary line L1 in the drawing). In this way, at the use position, the lamp 16 can be positioned relatively outside, so that light of the lamp 16 is hardly blocked by the bonnet 8, and the front of the tractor 1 is easily illuminated by the light from the lamp 16. Furthermore, the lamp 16 can be easily visually recognized from the front of the tractor 1.

On the other hand, in a case where the lamp 16 does not need to be used, such as a case where work is performed in a field, the lamp 16 can be switched to the storage position. As illustrated in FIG. 9B, in a state where the lamp 16 is switched to the storage position from the viewpoint of viewing the tractor 1 from the front direction (front view), the lamp 16 is located on an inner side (right side) of the outer end of the fender 6 (see the auxiliary line L1 in the drawing). In this manner, at the storage position, the lamp 16 can be positioned inside the fender 6, so that the lamp 16 can be prevented from interfering with surrounding crops, obstacles, and the like. This enables the tractor 1 to perform work in a narrow place. Furthermore, damage to the crops and damage to the lamp 16 can be reduced or prevented.

Furthermore, as indicated by a solid line in FIG. 10, in a state where the lamp 16 is switched to the storage position, the irradiation surface (translucent cover 16b) of the lamp 16 is disposed to face the inside (right side) of the vehicle body. This can effectively prevent the irradiation surface of the lamp 16 from being damaged. Moreover, in this state, since the second flat plate portion 131 is located on the outer side (left side) of the lamp 16, the lamp 16 can be protected from the outer side by the second flat plate portion 131, and furthermore, damage to the lamp 16 can be effectively reduced or prevented.

Furthermore, as illustrated in FIG. 10, in the state where the lamp 16 is switched to the storage position, at least a portion of the lamp 16 is disposed so as to be located inside the vehicle body with respect to an outer surface (see an auxiliary line L2 in the drawing) of the front safety frame 14 (lower frame 14a). This can effectively prevent the lamp 16 from being damaged.

Furthermore, as illustrated in FIG. 10, in a case where the lamp 16 is switched from the use position to the storage position, the lamp rotates forward. As a result, since the lamp 16 can be moved in a direction away from the step 10 on which the operator boards, it is possible to prevent the lamp 16 from hindering the work (for example, getting in and out of step 10, operation of the clutch pedal 12, and the like) by the operator.

As described above, the tractor 1 (working vehicle) according to the present example embodiment includes the fixing portion 130 to which the lamp 16 is fixed, and the support portion 110 that supports the fixing portion 130 and is capable of switching a position of the fixing portion 130 between the use position where at least a portion of the lamp 16 is located on the outer side of the vehicle body with respect to the fender 6 and the storage position where the lamp 16 is located on the inner side of the vehicle body with respect to the fender 6.

With such a configuration, by switching the position of the lamp 16 (fixing portion 130) to the storage position, it is possible to prevent the lamp 16 from interfering with surrounding crops, obstacles, and the like.

Furthermore, the support portion 110 supports the fixing portion 130 such that an irradiation surface of the lamp 16 faces an inside of the vehicle body in a state where the fixing portion 130 is switched to the storage position.

With such a configuration, since the irradiation surface of the lamp 16 faces the inside of the vehicle body at the storage position, it is possible to effectively reduce or prevent damage to the lamp 16 (in particular, the irradiation surface).

Furthermore, the fixing portion 130 includes the second flat plate portion 131 (flat plate portion) with a flat plate shape and fixed to a surface of the lamp 16 on a side opposite to the irradiation surface.

With this configuration, the lamp 16 can be protected from the outside by the second flat plate portion 131 (fixing portion 130) at the storage position, and damage to the lamp 16 can be effectively reduced or prevented.

Furthermore, the lamp 16 is disposed on a front side of the vehicle body with respect to a step 10 for an operator to board, and the support portion 110 switches to the storage position by rotating the fixing portion 130 at the use position forward.

With this configuration, in a case where the lamp 16 is switched to the storage position, the lamp 16 can be prevented from hindering the operator by being rotated in a direction away from the step 10 (forward).

Furthermore, the support portion 110 is provided in the front safety frame 14 (safety frame) on a front side of the vehicle body with respect to the step 10.

With such a configuration, the lamp 16 can be firmly supported.

Furthermore, the support portion 110 supports the fixing portion 130 such that at least a portion of the lamp 16 is located on an inner side of the vehicle body with respect to the front safety frame 14 in a state where the fixing portion 130 is switched to the storage position.

With such a configuration, at least a portion of the lamp 16 is located inside the vehicle body with respect to the front safety frame 14 at the storage position, so that it is possible to effectively reduce or prevent damage to the lamp 16.

Furthermore, the wiring 17 is connected to the lamp 16 and disposed so as to pass through an inside of the vehicle body of the front safety frame 14.

With this configuration, it is possible to prevent the wiring 17 from interfering with surrounding crops, obstacles, and the like.

Furthermore, the tractor 1 includes a holding mechanism (holder) 140 capable of holding the fixing portion 130 at the use position or the storage position.

With such a configuration, the lamp 16 (fixing portion 130) can be stably held at a predetermined position (the use position and the storage position).

Note that the tractor 1 according to the present example embodiment is an example embodiment of a working vehicle according to the present invention.

Furthermore, the second flat plate portion 131 according to the present example embodiment is an example embodiment of a flat plate portion according to the present invention.

Furthermore, the front safety frame 14 according to the present example embodiment is an example embodiment of a safety frame according to the present invention.

Next, a modification (second example embodiment) of the present invention will be described with reference to FIG. 11. A support portion 110 according to the second example embodiment is configured to switch to the storage position by rotating a fixing portion 130 (lamp 16) at the use position reward.

Figure 11:
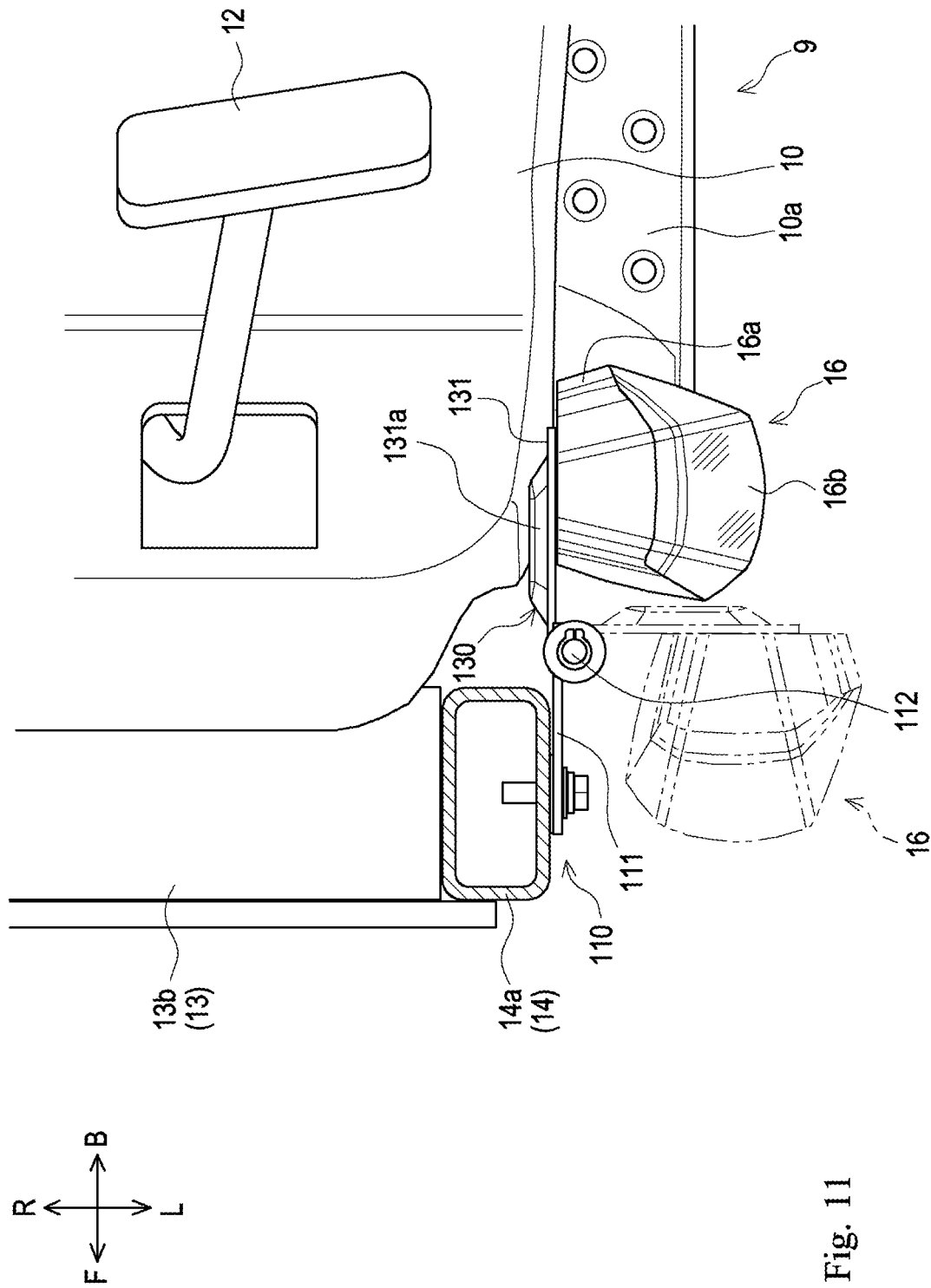
FIG. 11 is a partial cross-sectional plan view illustrating a lamp and a support mechanism according to a second example embodiment of the present invention.

Specifically, at the use position, as in the first example embodiment, an irradiation surface of the lamp 16 is disposed so as to face forward (see a two-dot chain line in FIG. 11). The fixing portion 130 (lamp 16) is rotated rearward by 90 degrees from this state, whereby the fixing portion 130 can be switched to the storage position. At the storage position, the irradiation surface of the lamp 16 faces outward.

Note that, in the second example embodiment, an insertion portion 112 (rotation fulcrum of the fixing portion 130) is disposed behind a front safety frame 14 so that the fixing portion 130 and the like do not interfere with the front safety frame 14 when the fixing portion 130 and the lamp 16 are rotated rearward. However, the arrangement of each member is not limited thereto, and can be arbitrarily changed.

As described above, the support portion 110 according to the second example embodiment supports the fixing portion 130 such that the irradiation surface of the lamp 16 faces an outside of a vehicle body in a state where the fixing portion 130 is switched to the storage position.

With such a configuration, since the irradiation surface of the lamp 16 faces the outside of the vehicle body at the storage position, it is possible to effectively reduce or prevent damage to a back surface (lamp housing 16a, light emitter provided in the lamp housing 16a, and the like) of the lamp 16.

Furthermore, the support portion 110 switches to the storage position by rotating the fixing portion 130 at the use position rearward.

With such a configuration, it is possible to reduce or prevent interference with surrounding crops, obstacles, and the like by housing the fixing portion 130 (lamp 16) behind.

Although example embodiments of the present invention have been described above, the present invention is not limited to the above configurations, and various modifications can be made within the scope of the present invention described in the claims.

For example, in the above example embodiments, the tractor 1 is exemplified as the working vehicle, but the present invention can be applied to other various working vehicles (agricultural vehicles, construction vehicles, industrial vehicles, etc.).

Furthermore, in the above example embodiments, the lamp 16 is provided in the front safety frame 14, but may be provided in another safety frame (the rear safety frame 15) or another member (for example, the fender 6 and the like).

Furthermore, in the above example embodiments, the lamp 16 is disposed on the front side of the step 10, but the lamp 16 may be disposed at the same position as the step 10 in the front-rear direction, or may be disposed on the rear side of the step 10. For example, in a case where the lamp 16 is provided behind the step 10 (in the fender 6, the rear safety frame 15, or the like), the lamp 16 is configured to rotate rearward (in a direction away from the step 10), so that it is possible to reduce or prevent the lamp 16 from interfering with the operator.

Furthermore, the arrangement (position, orientation, and the like) of the lamp 16 (fixing portion 130) at the use position and the storage position is merely an example, and can be arbitrarily changed. For example, the configuration in which the fixing portion 130 at the use position is rotated by 90 degrees to switch to the storage position is exemplified, but the angle at the time of switching the position can be arbitrarily changed. For example, the fixing portion 130 may be rotated 180 degrees from the use position to switch to the storage position. Furthermore, the lamp 16 may direct the irradiation surface rearward at the use position.

Furthermore, in the example embodiments described herein, the lamp 16 has been described as being used as a direction indicator or a vehicle width lamp, but the application of the lamp 16 is not limited thereto, and various example embodiments of the present invention can be applied to the lamp 16 for various applications.

Example embodiments of the present invention and modifications and combinations thereof can be applied to a working vehicle including a lamp.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A working vehicle comprising:
    a fixing portion to which a lamp is fixed; and
    a support portion that supports the fixing portion and is capable of switching a position of the fixing portion between a use position where at least a portion of the lamp is located on an outer side of a vehicle body with respect to a fender and a storage position where the lamp is located on an inner side of the vehicle body with respect to the fender; wherein
    the support portion is attached to a safety frame on a front side of the vehicle body with respect to a step for an operator to board;
    the safety frame includes a lower frame fixed to the vehicle body, and an upper frame provided so as to be able to rock forward and backward with respect to the lower frame; and
    the support portion is fixed to the lower frame.

2. The working vehicle according to claim 1, wherein the support portion supports the fixing portion such that an irradiation surface of the lamp faces an inside of the vehicle body in a state in which the fixing portion is in the storage position.

3. The working vehicle according to claim 2, wherein the fixing portion includes a flat plate portion with a flat plate shape and fixed to a surface of the lamp on a side opposite to the irradiation surface.

4. The working vehicle according to claim 3, wherein
the lamp is on a front side of the vehicle body with respect to the step; and
the supporting portion is capable of switching to the storage position by rotating forward the fixing portion from the use position.

5. The working vehicle according to claim 3, wherein the support portion supports the fixing portion such that at least a portion of the lamp is located on an inner side of the vehicle body with respect to the safety frame in a state that the fixing portion is in the storage position.

6. The working vehicle according to claim 2, further comprising a wiring; wherein
the support portion supports the fixing portion such that the lamp is located on a front side of the vehicle body with respect to the lower frame; and
the wiring is connected to the lamp and extends in front of and on an inside of the lower frame.

7. The working vehicle according to claim 2, wherein the support portion supports the fixing portion such that at least a portion of the lamp is located on an inner side of the vehicle body with respect to the safety frame in a state in which the fixing portion is in the storage position.

8. The working vehicle according to claim 7, further comprising a wiring; wherein
the support portion supports the fixing portion such that the lamp is located on a front side of the vehicle body with respect to the lower frame; and
the wiring is connected to the lamp and extends in front of and on an inside of the lower frame.

9. The working vehicle according to claim 2, wherein
the lamp is on a front side of the vehicle body with respect to the step; and
the supporting portion is capable of switching to the storage position by rotating forward the fixing portion from the use position.

10. The working vehicle according to claim 3, further comprising a wiring; wherein
the support portion supports the fixing portion such that the lamp is located on a front side of the vehicle body with respect to the lower frame; and
the wiring is connected to the lamp and extends in front of and on an inside of the lower frame.

11. The working vehicle according to claim 1, wherein the support portion supports the fixing portion such that at least a portion of the lamp is located on an inner side of the vehicle body with respect to the safety frame in a state that the fixing portion is in the storage position.

12. The working vehicle according to claim 11, further comprising a wiring; wherein
the support portion supports the fixing portion such that the lamp is located on a front side of the vehicle body with respect to the lower frame; and
the wiring is connected to the lamp and extends in front of and on an inside of the lower frame.

13. The working vehicle according to claim 1, wherein
the lamp is on a front side of the vehicle body with respect to the step; and
the supporting portion is capable of switching to the storage position by rotating forward the fixing portion from the use position.

14. The working vehicle according to claim 1, further comprising a wiring; wherein
the support portion supports the fixing portion such that the lamp is located on a front side of the vehicle body with respect to the lower frame; and
the wiring is connected to the lamp and extends in front of and on an inside of the lower frame.

15. The working vehicle according to claim 1, wherein the support portion supports the fixing portion such that an irradiation surface of the lamp faces an outside of the vehicle body in a state that the fixing portion is in the storage position.

16. The working vehicle according to claim 1, wherein the support portion is capable of switching to the storage position by rotating rearward the fixing portion from the use position.

17. The working vehicle according to claim 1, further comprising a holder capable of holding the fixing portion at the use position or the storage position.

* * * * *